(12) United States Patent
Krishna et al.

(10) Patent No.: US 11,803,485 B2
(45) Date of Patent: Oct. 31, 2023

(54) MICROSERVICE SYSTEM WITH GLOBAL CONTEXT CACHE

(71) Applicant: International Business Machines Corporation, Armonk, NY (US)

(72) Inventors: Hariharan Krishna, Bangalore (IN); Shajeer K Mohammed, Bangalore (IN); Sudheesh S. Kairali, Kozhikode (IN)

(73) Assignee: International Business Machines Corporation, Armonk, NY (US)

( * ) Notice: Subject to any disclaimer, the term of this patent is extended or adjusted under 35 U.S.C. 154(b) by 15 days.

(21) Appl. No.: 17/198,458

(22) Filed: Mar. 11, 2021

(65) Prior Publication Data

US 2022/0292032 A1 Sep. 15, 2022

(51) Int. Cl.
*G06F 12/12* (2016.01)
*G06F 12/02* (2006.01)
(Continued)

(52) U.S. Cl.
CPC ........ *G06F 12/128* (2013.01); *G06F 9/30047* (2013.01); *G06F 12/0238* (2013.01); *G06F 12/0891* (2013.01)

(58) Field of Classification Search
CPC .............. G06F 12/128; G06F 12/0891; G06F 12/0238; G06F 9/30047; G06F 12/12; G06F 12/02
See application file for complete search history.

(56) References Cited

U.S. PATENT DOCUMENTS 8,661,068 B1 * 2/2014 Seibel ................... G06F 16/172
707/825
9,767,032 B2 * 9/2017 Talagala .............. G06F 12/0866
(Continued)

FOREIGN PATENT DOCUMENTS

| CA | 2751180 A3 | 8/2010 |
| CN | 111078426 A | 4/2020 |
| CN | 112256408 A | 1/2021 |

OTHER PUBLICATIONS

R. Appuswamy, D. C. van Moolenbroek and A. S. Tanenbaum, "Cache, cache everywhere, flushing all hits down the sink: On exclusivity in multilevel, hybrid caches," 2013 IEEE 29th Symposium on Mass Storage Systems and Technologies (MSST), 2013, pp. 1-14.*

(Continued)

*Primary Examiner* — Pierre Michel Bataille
(74) *Attorney, Agent, or Firm* — Rakesh Roy; Hunter E. Webb; Keohane & D'Alessandro, PLLC (57) ABSTRACT

Disclosed embodiments provide features for the architecture of microservices. A global context cache is created for a microservice environment that is accessible from multiple deployed microservices. Data from various customers/applications can be aggregated to establish a determination of when a read or write access would fail due to permissions, and/or other condition such as existence or non-existence of certain data. In such situations, an error can be returned from the global context cache in much less time than if the access request propagated throughout the computer network to the persistent storage. In this way, disclosed embodiments reduce downtime and save money for organizations, and increase the efficiency of utilization of computer resources.

18 Claims, 5 Drawing Sheets

(51) Int. Cl.
*G06F 12/128* (2016.01)
*G06F 9/30* (2018.01)
*G06F 12/0891* (2016.01)

(56) References Cited

U.S. PATENT DOCUMENTS

| | | | | |
|---|---|---|---|---|
| 2017/0132154 | A1* | 5/2017 | Bakke | G06F 3/065 |
| 2017/0353577 | A1* | 12/2017 | Lutz | H04L 67/5682 |
| 2018/0025025 | A1 | 1/2018 | Davis et al. | |
| 2018/0041336 | A1* | 2/2018 | Keshava | H04L 9/0891 |
| 2018/0321993 | A1* | 11/2018 | McClory | G06F 8/41 |
| 2019/0065061 | A1 | 2/2019 | Kim et al. | |
| 2019/0354528 | A1 | 11/2019 | Demazeau et al. | |
| 2020/0057671 | A1 | 2/2020 | Bailey et al. | |
| 2020/0186571 | A1 | 6/2020 | Lynk et al. | |
| 2020/0201775 | A1 | 6/2020 | Zhang et al. | |
| 2020/0244638 | A1* | 7/2020 | Gupta | H04L 63/0815 |
| 2021/0081252 | A1* | 3/2021 | Bhargava | H04L 63/0245 |

OTHER PUBLICATIONS

G. Zhang, K. Ren, J.-S. Ahn and S. Ben-Romdhane, "GRIT: Consistent Distributed Transactions Across Polyglot Microservices with Multiple Databases," 2019 IEEE 35th International Conference on Data Engineering (ICDE), Macao, China, 2019, pp. 2024-2027.*

K. Munonye and P. Martinek, "Evaluation of Data Storage Patterns in Microservices Archicture," 2020 IEEE 15th International Conference of System of Systems Engineering (SoSE), Budapest, Hungary, 2020, pp. 373-380.*

M. Dorier et al., "Methodology for the Rapid Development of Scalable HPC Data Services," 2018 IEEE/ACM 3rd International Workshop on Parallel Data Storage & Data Intensive Scalable Computing Systems (PDSW-DISCS), Dallas, TX, USA, 2018, pp. 76-87.*

David Abramson et al., "A Cache-Based Data Movement Infrastructure for On-demand Scientific Cloud Computing", SCFA 2019, pp. 38-56, 2019.

Flexera Blog, "Architecting Scalable Applications in the Cloud: Database Tier", Copyright 2021 Flexera, 7 pages.

Dulcardo Arteaga et al., "CloudCache: On-demand Flash Cache Management for Cloud Computing", 14th USENIX Conference on File and Storage Technologies (FAST '16), Feb. 22-25, 2016, 16 pages.

Zebware, "Orchesto Read & Write Cache", Copyright 2020 Zebware, 4 pages.

Liu, Shan, "PCT Search Report and Written Opinion", PCT/CN2022/076020, dated May 11, 2022, 10 pgs.

* cited by examiner

| MICROSERVICE CONFIGURATION | |
|---|---|
| READ CACHE ENABLE | R |
| WRITE CACHE ENABLE | W |
| DISCARD CACHE EN. | X |
| DELETE CACHE EN. | T |
| HIT RATE | H |
| FLUSH TIME | F |

FIG. 4A

Microservice Global Context Cache Configuration

☒ Read Cache Enable
☒ Write Cache Enable
☒ Discard Cache Enable
☐ Delete Cache Enable

| | READ | WRITE | DISCARD | DELETE |
|---|---|---|---|---|
| Hit Rate | 30/s | 30/s | 5/s | 30/s |
| Flush Time | 300s | 300s | 5s | 300s |

MICROSERVICE SYSTEM WITH GLOBAL CONTEXT CACHE

FIELD

Disclosed embodiments relate generally to computer application deployment, and more particularly, to a microservice system with a global context cache.

BACKGROUND

Microservices are an architectural technique for software development where software is composed of small independent services that communicate over well-defined interfaces. In a microservices architecture, an application is built as independent components that run each application process as a service. These services communicate via a well-defined interface using lightweight APIs. Services are built for specific capabilities and each service performs a single function. Because they are independently run, each service can be updated, deployed, and scaled to meet demand for specific functions of an application. Microservice architectures make applications easier to scale and faster to develop, enabling innovation and accelerating time-to-market for new features. As such, microservices are used in a wide variety of enterprises, including, business, education, and government computer applications.

SUMMARY

In one embodiment there is provided a computer-implemented method comprising: building a global context cache for a plurality of microservice applications, wherein the global context cache includes a read cache, a write cache, and a discard cache; receiving an access request from a microservice from the plurality of microservice applications; determining if the received access request will fail based on cache data in the global context cache; and in response to determining that the received access request will fail, returning an error to the microservice from the global context cache.

In another embodiment, there is provided an electronic computation device comprising: a processor; a memory coupled to the processor, the memory containing instructions, that when executed by the processor, cause the electronic computation device to: build a global context cache for a plurality of microservice applications, wherein the global context cache includes a read cache, a write cache, and a discard cache; receive an access request from a microservice from the plurality of microservice applications; determine if the received access request will fail based on cache data in the global context cache; and in response to determining that the received access request will fail, return an error to the microservice from the global context cache.

In another embodiment, there is provided a computer program product for an electronic computation device comprising a computer readable storage medium having program instructions embodied therewith, the program instructions executable by a processor to cause the electronic computation device to: build a global context cache for a plurality of microservice applications, wherein the global context cache includes a read cache, a write cache, and a discard cache; receive an access request from a microservice from the plurality of microservice applications; determine if the received access request will fail based on cache data in the global context cache; and in response to determining that the received access request will fail, return an error to the microservice from the global context cache.

The drawings are not necessarily to scale. The drawings are merely representations, not necessarily intended to portray specific parameters of the invention. The drawings are intended to depict only example embodiments of the invention, and therefore should not be considered as limiting in scope. In the drawings, like numbering may represent like elements. Furthermore, certain elements in some of the Figures may be omitted, or illustrated not-to-scale, for illustrative clarity.

DETAILED DESCRIPTION

Disclosed embodiments provide improvements in the architecture of microservices. A global context cache is created for a microservice environment that is accessible from multiple deployed microservices. Data from various customers/applications can be aggregated to establish a determination of when a read or write access would fail due to permissions, and/or other condition such as existence or non-existence of certain data. In such situations, an error can be returned from the global context cache in much less time than if the access request propagated throughout the computer network to the persistent storage. In this way, disclosed embodiments reduce downtime and save money for organizations, and increase the efficiency of utilization of computer resources.

Reference throughout this specification to "one embodiment," "an embodiment," "some embodiments", or similar language means that a particular feature, structure, or characteristic described in connection with the embodiment is included in at least one embodiment of the present invention. Thus, appearances of the phrases "in one embodiment," "in an embodiment," "in some embodiments", and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope and purpose of the invention. Thus, it is intended that the present invention cover the modifications and variations of this invention provided they come within the scope of the appended claims and their equivalents. Reference will now be made in detail to the preferred embodiments of the invention.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", or "has" and/or "having", when used in this specification, specify the presence of stated features, regions, integers, steps, operations, elements, and/or components, but do not preclude the presence or addition of one or more other features, regions, or elements.

Figure 1:
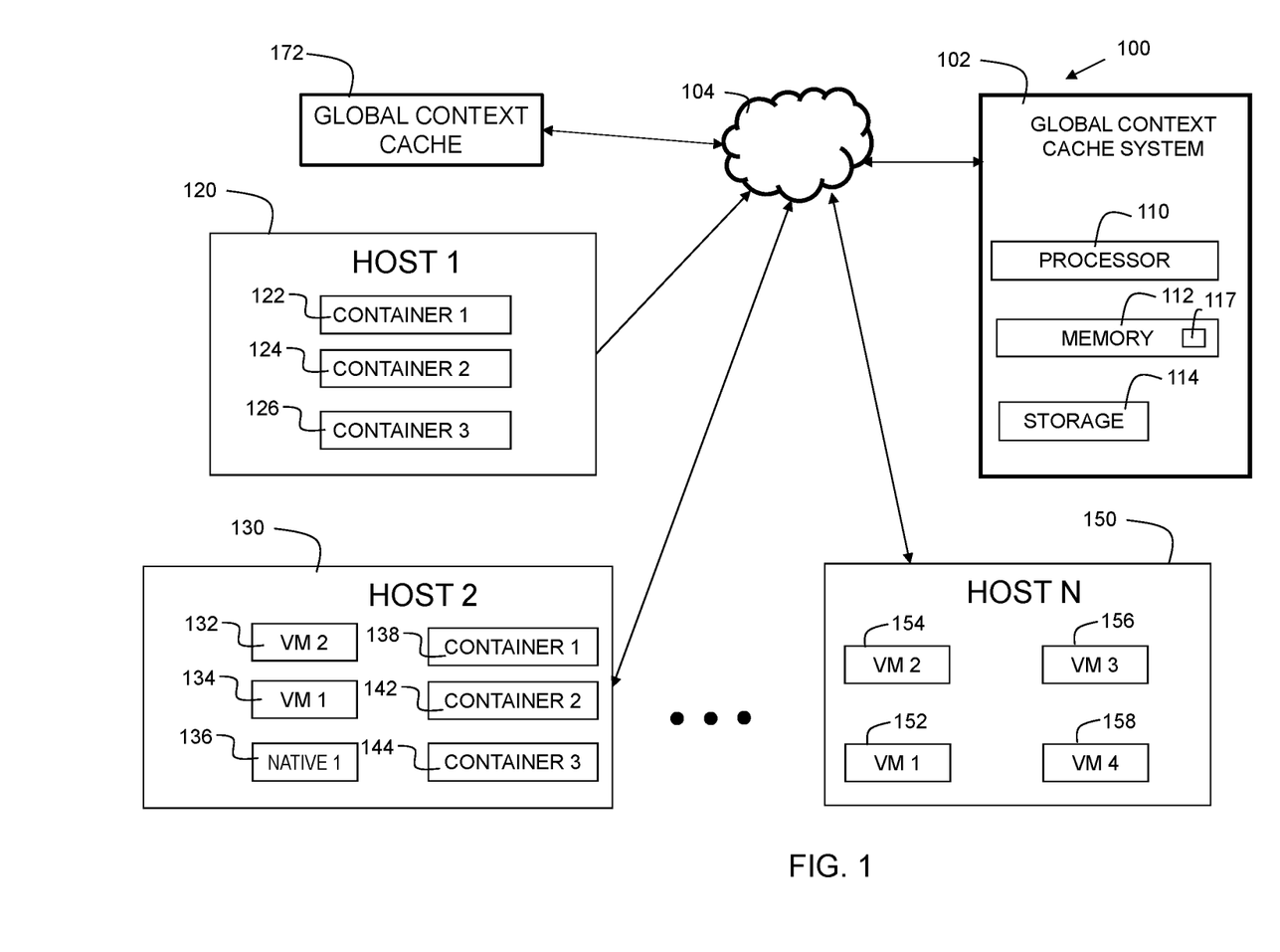
FIG. 1 is an environment for embodiments of the present invention.

FIG. 1 shows an environment 100 for embodiments of the present invention. Global Context Cache System (GCCS) 102 includes a processor 110, memory 112, and storage 114. In some embodiments, the storage 114 and/or memory 112 may contain instructions 117, which when executed by processor 110, control and manage operations of global context cache 172. In some embodiments, the storage and/or memory for the global context cache may reside in one or more devices external to the GCCS). Memory 112 stores instructions, which when executed by the processor, cause system 102 to implement embodiments of the present invention. System 102 is connected to network 104. Network 104 is the Internet, a wide area network, local area network, or other suitable network. System 102 is an electronic computation device.

In general, microservices are software applications which are made up of independently deployable, modular services. Each microservice runs a unique process and communicates through a well-defined, lightweight mechanism, such as a container, to serve a business or operational task or goal. The additional components shown in FIG. 1 illustrate examples of an environment in which microservices may operate. However, disclosed embodiments are not limited to such environments.

Referring again to FIG. 1, three computers that implement a cluster of nodes are shown also connected to the network. These computers are Host 1 120, Host 2 130, and Host N 150. Host 1 120, Host 2 130, and Host N 150 are computer systems (host machines) which may include thereon one or more containers, one or more virtual machines (VMs), or one or more native applications. These host machines are typically self-sufficient, including a processor (or multiple processors), memory, and instructions thereon. Host 1 120, Host 2 130, and Host N 150 are each computers that together implement a cluster.

Host 1 includes instances of three containers: Container 1 122, Container 2 124, and Container 3 126. A container image is a lightweight, stand-alone, executable package of software that includes everything needed to perform a role that includes one or more tasks. The container can include code, runtime libraries, system tools, system libraries, and/or configuration settings. Containerized software operates with some independence regarding the host machine/environment. Thus, containers serve to isolate software from their surroundings.

Host 2 130 includes instances of virtual machines, containers, and a native application. The containers are Container 1 138, Container 2 142, and Container 3 144. The Native 1 136 is a native application, operating system, native instruction set, or other native program that is implemented specially for the particular model of the computer or microprocessor, rather than in an emulation or compatibility mode. The virtual machines are VM 2 132 and VM 1 134.

Host N includes instances of four virtual machines: VM 2 154, VM 1 152, VM 3 156, and VM 4 158. A virtual machine (VM) is an operating system or application environment that is installed as software, which imitates dedicated hardware. The virtual machine imitates the dedicated hardware, providing the end user with the same experience on the virtual machine as they would have on dedicated hardware.

Accordingly, in some embodiments, hosts can include only a single type of environment, such as containers, virtual machines, or native applications. Alternatively, a host can include a plurality of such, like in the example of Host 2. In some cases, instances of the container, virtual machine, or native application may be replicated on more than one host. This is shown here as first instances of Container 1 122, Container 2 124, and Container 3 126 on Host 1 120, and second instances of each are Container 1 138, Container 2 142, and Container 3 144 on Host 2. In addition, first instances of VM 2 132 and VM 1 134 are on Host 2 130, and second instances of VM 2 154 and VM 1 152 are on Host N 150.

In a microservice environment, transactions such as reads and writes take a finite amount of time, and consume important computer system resources such as network bandwidth, and device access. It is therefore desirable to have improvements in the field of microservice deployments.

Figure 2:
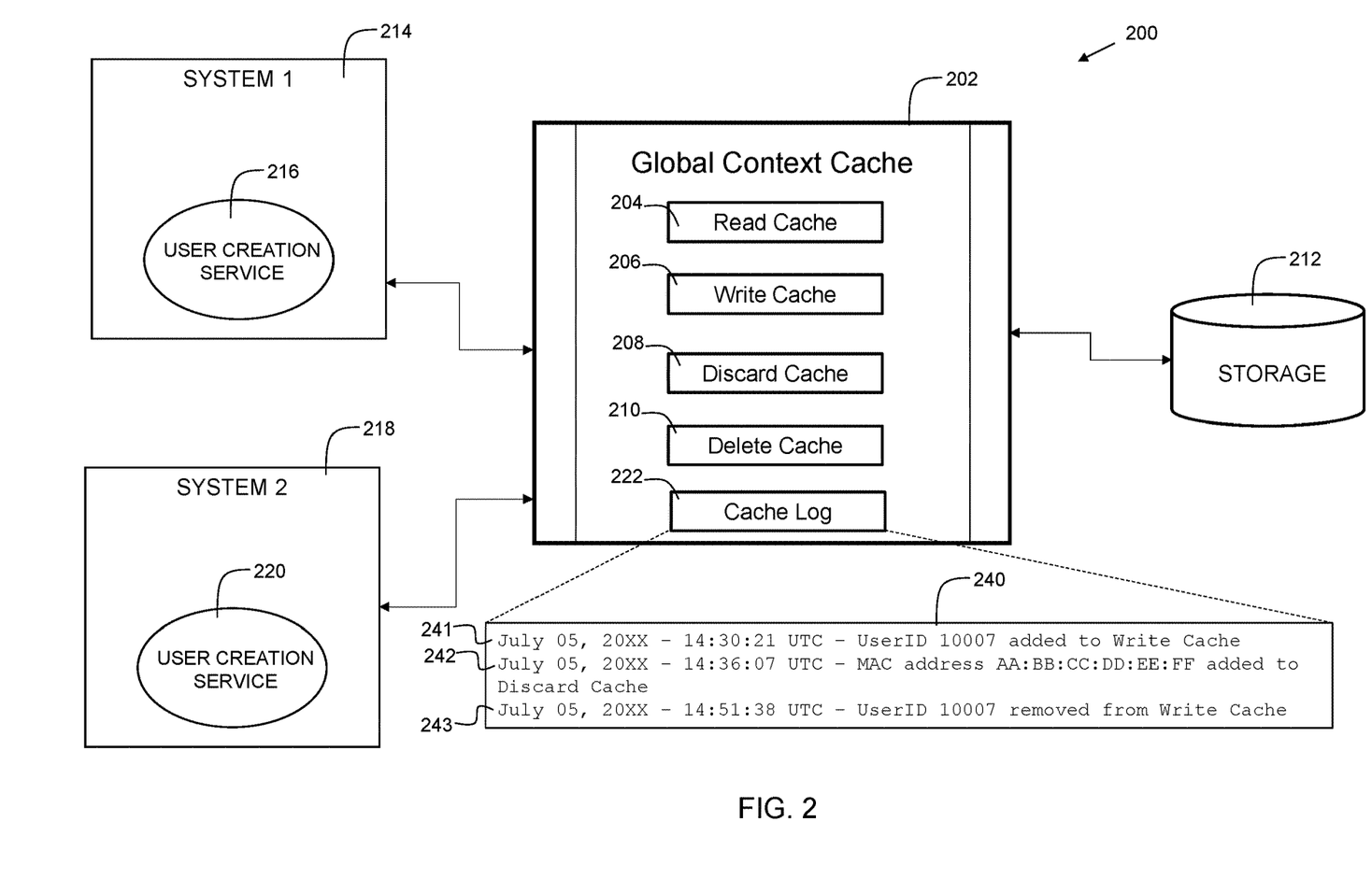
FIG. 2 shows an example usage of a global context cache in accordance with embodiments of the present invention.

FIG. 2 shows an example usage of a global context cache 202 in accordance with embodiments of the present invention. Global context cache 202 may be similar to global context cache 172 of FIG. 1. System 200 includes a first computer system 214 and a second computer system 218. The first system ("System 1") 214 is hosting user creation service 216 for creation of a user account. The second system ("System 2") 218 is hosting user creation service 218 for creation of a user account. User creation service 216 and user creation service 220 are microservices. The global context cache 202 includes four cache entry tables: read cache 204, write cache 206, discard cache 208, and delete cache 210. The global context cache 202 arbitrates access to persistent storage 212 for one or more microservices.

Continuing with the example shown in FIG. 2, user creation service 216 creates attempts to create an account for a user. This requires user creation service 216 to access storage 212 to create a new entry for the user. At some time later, user creation service 220 in System 2 attempts to create a new user account for the same user. Because that user record has already been created, an attempt to create that account again will fail. In embodiments of the present invention, a record of the account creation is stored in the global context cache 202, in the write cache table 206. Thus, when user creation service 220 attempts to create the new user account, an error status is returned to user creation service 220 by the global context cache 202 without the need to access storage 212. This can save considerable time and resources, as the error status is returned within milliseconds, rather than on the order of seconds if the request was routed to storage 212. In this way, the efficiency of microservice system operation is greatly improved.

In embodiments, the read cache 204 contains data that has previously been read by a microservice. If another read of that data is performed by a microservice, the data can be provided to that microservice from the read cache 204 directly, instead of accessing the storage 212, thereby providing a faster read operation by using cached data.

In embodiments, the write cache 206 is a cache of metadata related to a write operation to the storage 212 that is performed by a microservice. As an example, if a new user is created with a specific identifier, then an entry corresponding to that identifier is created in the write cache 206. This metadata can be used to infer that a subsequent write may fail.

In embodiments, the discard cache includes metadata for one or more previous access requests that were discarded due to an access failure. In embodiments, the discard cache 208 is a cache of metadata pertaining to previous write requests that have failed. The metadata can include a reason code. The reason code can include the reason the write had failed. Such reasons can include, but are not limited to, permissions error, invalid location, invalid data format, device failure, and others. In embodiments, the discard cache 208 is used by the GCCS 102 to further optimize write operations.

In embodiments, building the global context cache further includes building a delete cache 210. In embodiments, the delete cache 210 contains data regarding entries/records that have been deleted from the storage 212. By tracking such deletions in the global context cache 202, disclosed embodiments can preemptively identify a write failure that would occur due to a record no longer existing, and quickly return an appropriate error code to the calling microservice. This saves considerable time as compared to a system that does not have a global context cache, in which case, the write request would need to propagate all the way to the storage 212, obtain the failure, and that failure then would need to travel back to the microservice, taking considerably more time. Thus, disclosed embodiments improve the technical field of microservice access performance.

Some embodiments may optionally include a Cache Log 222. The cache log may include a log file indicating a time when cache data was added and/or removed from a given cache. This cache data can be used for diagnostics and troubleshooting. Thus, embodiments can include creating a cache log for the global context cache, where the cache log contains a timestamped entry for each entry added to the global context cache (the read, write, discard, and/or delete caches of the global context cache). Embodiments can further include creating a cache log for the global context cache, where the cache log contains a timestamped entry for each entry deleted from the global context cache (the read, write, discard, and/or delete caches of the global context cache). In some embodiments, the cache log may contain both additions and deletions from the read, write, discard, and/or delete caches of the global context cache.

An example cache log excerpt is shown at 240. Entry 241 shows a timestamped entry for an addition to a write cache. Entry 242 shows a timestamped entry for an addition to a discard cache. Entry 243 shows a timestamped entry for a deletion (removal) of data from a write cache. These entries are exemplary, and many other cache additions and deletions may be included in the cache log.

Figure 3A:
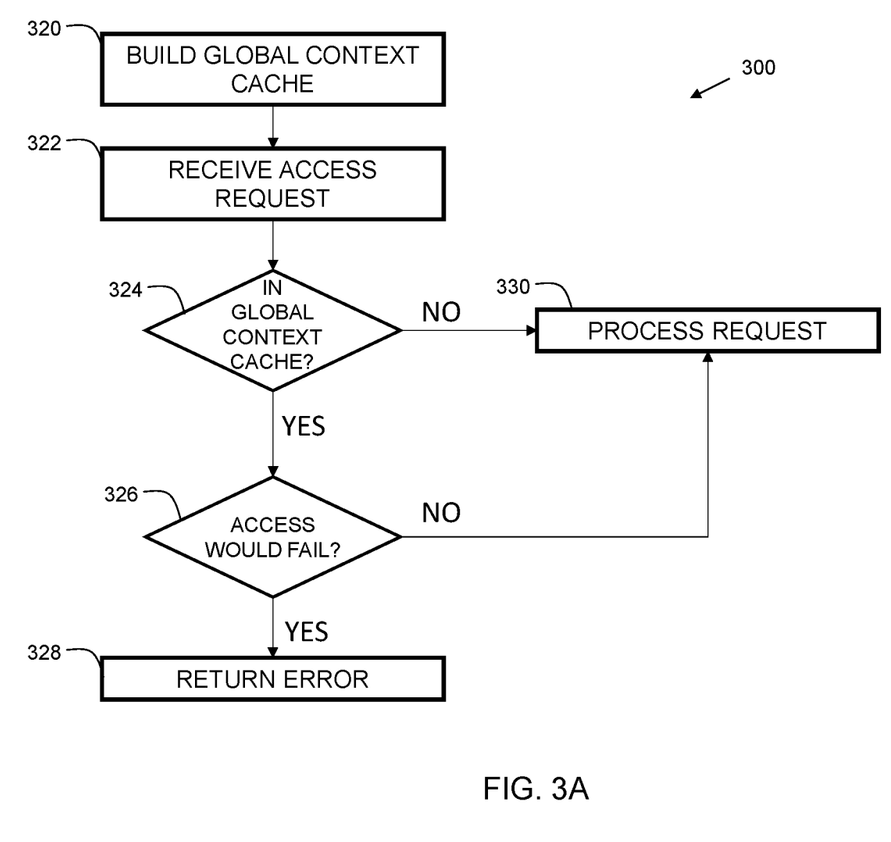
FIG. 3A is a flowchart indicating process steps in accordance with embodiments of the present invention.

FIG. 3A is a flowchart 300 indicating process steps in accordance with embodiments of the present invention. At 320, a global context cache is built. In embodiments, this is accomplished by implementing the global context cache such that all reads for chosen microservices are filtered by a microservice read cache builder. Then, on subsequent write operations, the read cache will be analyzed for a match of context-specific metadata. In embodiments, the context-specific metadata can include a user identifier. The user identifier can be used to determine if certain transactions, such as a write request related to user creation, would fail since the user identifier already exists as confirmed by cache data in the read cache. Thus, write operations by microservices are optimized based on the global context cache. In order to save storage and improve match efficiency of the cache, embodiments can use context related dimensionality reduction. The context related dimensionality may be used when the read cache has more values than required in the context. For example, a user data record may include a username, UserId, Age, email Id and so on. A function that requires a database write, such as a createUser function might only need to check on UserId and username to determine if the createUser function would fail. Thus, in the context of the createUser function, other dimensions do not need to be searched. Thus, by utilizing context related dimensionality, disclosed embodiments can achieve additional performance benefits.

At 322, an access request is received. This can be a write access via HTTP POST, or other suitable methods. At 324, a check is made to see if a similar entry is in the global context cache. If not in the cache, then request is processed at 330. If a corresponding entry is in the cache, then at 356 a check is made to see if the access/transaction would fail or be denied. If not, then the request is processed at 330 (where the access request proceeds to persistent storage 212). At 326 a check is made to determine if an access, such as a write access would fail. In embodiments, determining if the received access request will fail based on cache data in the global context cache can include examining cache data for the existence of unique identifiers, and evaluating the requested access context. If the requested access context involves creation of a unique identifier that is confirmed to exist already, then it can be determined that access would fail. Examples include creation of a specific user id or user name that is supposed to be unique. If, based on the global context cache, it is known that the user id or user name already exists, then at 326, it is determined that the access would fail. If yes at 326, the process continues to 328 where an error is returned to the microservice. In this case, the error is returned much faster than if the request had to proceed through the complete network to the persistent storage. In this way, the network bandwidth and device resources are used in a more efficient manner, and the speed of operation of microservices are improved. Thus, in embodiments, in response to not determining that the access request will be denied, or otherwise fail, the received access request is processed.

Figure 3B:
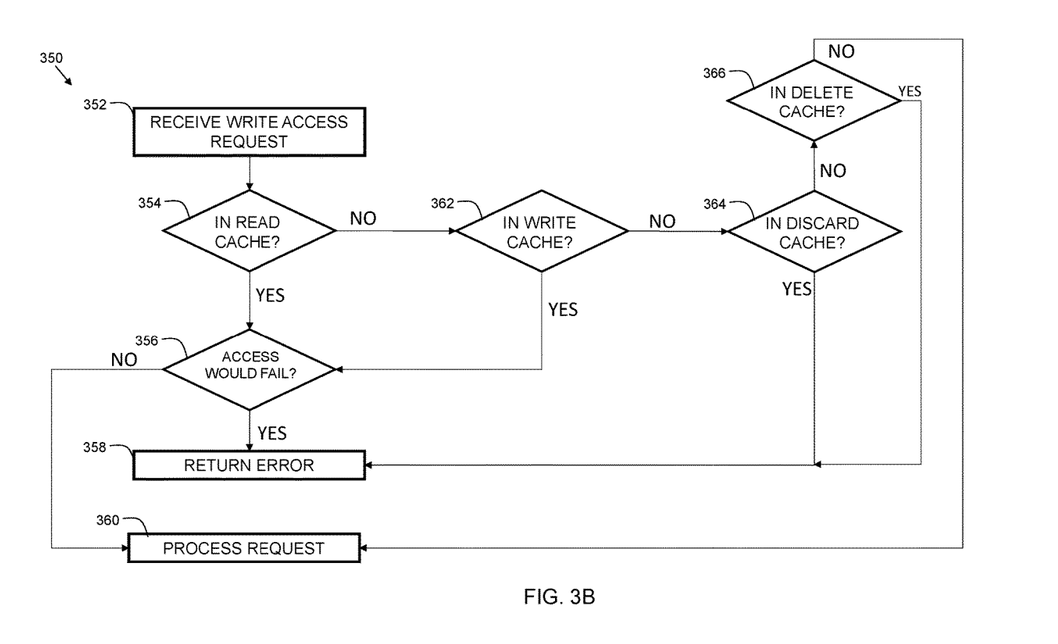
FIG. 3B is a flowchart indicating additional process steps in accordance with embodiments of the present invention.

FIG. 3B is a flowchart 350 indicating additional process steps in accordance with embodiments of the present invention. Flowchart 350 shows additional details regarding the process of checking the global context cache 202 of FIG. 2. At 352, a write access request is received by the global context cache from a participating microservice. At 354, a check is made to determine if a corresponding entry is in the read cache (204 of FIG. 2). If an entry does exist, then a check is made at 356 to determine if it can be inferred that the write access request received at 352 would fail. In embodiments, this may be based on contextual information. Examples can include creation of a user identifier, or any other identifier that is required to be unique, such as an entry based on a MAC address, serial number, or other unique identifier. Upon detecting previous read transactions in the read cache that confirm the entry with the unique identifier already exists, then the process continues to 358 where an error is returned to the calling microservice. If no determination of failure exists, then the request is processed at 360, allowing the write access to be attempted at the persistent storage 212.

If at 354, a corresponding entry is not in the read cache, then the process continues to 362 where the write cache is checked (206 of FIG. 2). If an entry does exist, then a check is made at 356 to determine if it can be inferred that the write access request received at 352 would fail. In embodiments, this may be based on contextual information. Examples can include creation of a user identifier, or any other identifier that is required to be unique, such as an entry based on a MAC address, serial number, or other unique identifier. Upon detecting previous write transactions in the write cache that confirm the entry with the unique identifier already exists, then the process continues to 358 where an error is returned to the calling microservice. If no determination of failure exists, then the request is processed at 360, allowing the write access to be attempted at the persistent storage 212.

If at 362, a corresponding entry is not in the write cache, then the process continues to 364 where the discard cache (208 of FIG. 2) is checked. Since the discard cache contains a record of write access attempts that previously failed, then if an entry does exist, then an error is returned to the microservice at 358. If an entry does not exist, then the process continues to 366 where the delete cache (210 of FIG. 2) is checked. Since the discard cache contains a record of database entries that have been removed, then if a delete cache entry does exist, then an error is returned to the microservice at 358. If not, then the request is processed at 360, allowing the write access to be attempted at the persistent storage 212.

Figure 4A:
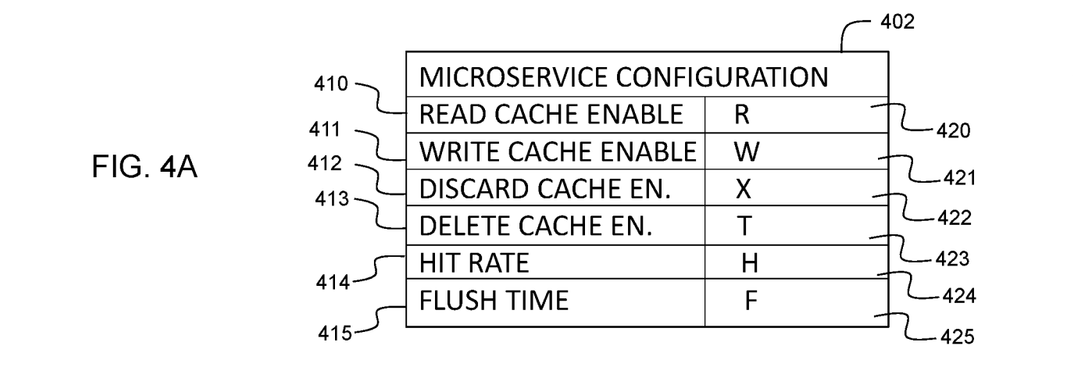
FIG. 4A shows global context cache configuration data in accordance with embodiments of the present invention.

FIG. 4A shows global context cache configuration data 400 in accordance with embodiments of the present invention. A data structure 402 may include one or more microservice configuration parameters. At 410, there is a read cache enable parameter having a value R at 420. In embodiments, the value of R can be "enabled" or "disabled." At 411, there is a write cache enable parameter having a value W at 421. In embodiments, the value of W can be "enabled" or "disabled." At 412, there is a discard cache enable parameter having a value X at 422. In embodiments, the value of X can be "enabled" or "disabled." At 413, there is a delete cache enable parameter having a value T at 423. In embodiments, the value of T can be "enabled" or "disabled."

At 414, there is a hit rate parameter having a value H at 424. In embodiments, the value of H can be a rate of cache hits per second representing a threshold to create a cache entry for a particular read or write transaction. At 415, there is a flush time parameter having a value F at 425. In embodiments, the value of F can be a time in seconds or milliseconds that serve as a threshold for when an entry is to be flushed from the cache to make room for new entries. In embodiments, H and F can be arrays, allowing a corresponding entry for each cache type (read, write, discard, delete) within the global context cache 202.

Figure 4B:
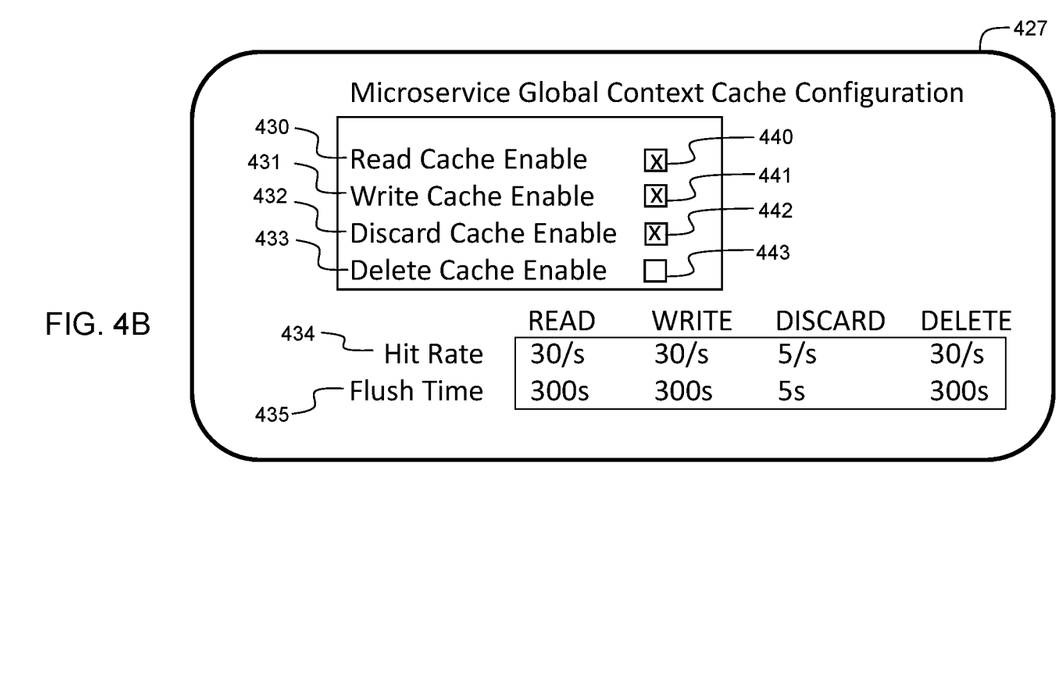
FIG. 4B shows a user interface for an exemplary configuration screen for the Global Context Cache System in accordance with embodiments of the present invention.

User interface 427 shows an exemplary configuration screen for the Global Context Cache System (GCCS) 102. In embodiments, an administrator may have the capability to configure a microservice to use none, some, or all of the caches provided by the global context cache. In embodiments, changes made by the administrator by utilizing user interface 427 are reflected in the data structure 402 of FIG. 4A. At 430 there is a field for read cache enable. This enables the use of read cache 204 for a microservice. The associated checkbox 440 that is checked with an "x" indicates that the read cache is enabled in this example. At 431 there is a field for write cache enable. This enables the use of write cache 206 for a microservice. The associated checkbox 441 that is checked with an "x" indicates that the write cache is enabled in this example. At 432 there is a field for discard cache enable. This enables the use of discard cache 208 for a microservice. The associated checkbox 442 that is checked with an "x" indicates that the discard cache is enabled in this example. At 433 there is a field for delete cache enable. This enables the use of delete cache 210 for a microservice. The associated checkbox 443 that is empty indicates that the delete cache is disabled in this example.

In addition to the enabling and disabling of caches, one or more cache performance parameters may also be configured in some embodiments. As shown in FIG. 4B, there is a hit rate parameter 434 and a flush time parameter 435 that are configurable for each cache (204, 206, 208, 210) in the global context cache. When a user enters hit rate parameters and/or flush time parameters into the user interface 427, they may then be transferred to the data structure 402 of FIG. 4A. Thus, embodiments can include establishing a hit rate parameter for the read cache, write cache, discard cache, and delete cache. Additionally, embodiments can include establishing a flush time parameter for the read cache, write cache, discard cache, and delete cache.

The above options are configurable by an administrator such that the options can be optimized for a given microservice. Furthermore, if it is determined that the caching is causing an execution error and/or degraded performance, each cache can be disabled individually for troubleshooting purposes.

As can now be appreciated, disclosed embodiments serve to improve the technical field of operating microservice applications, by optimizing write transactions. By keeping track of the context of various reads or writes, it can be determined that certain write transactions will fail. In these cases, a global context cache enables return of an error code much faster than allowing the write transaction to propagate through a computer system and network, only to obtain the same failure result. Thus, disclosed embodiments reduce downtime and save money for organizations, and increase the efficiency of utilization of computer resources.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
building a global context cache for a plurality of microservice applications, each microservice application of the plurality of microservice applications being composed of a plurality of microservices, each microservice of the plurality of microservices being an independently deployed single process module that is executed in conjunction with other microservice applications in the microservice application, wherein the global context cache includes a read cache that contains data that has previously been read by at least one microservice of the plurality of microservices, a write cache that contains metadata related to a write operation to storage that has been performed by a microservice of the plurality of microservices, and a discard cache that includes metadata for at least one previous access request that was discarded due to an access failure;
receiving an access request from a microservice from the plurality of microservice applications;
checking, in response to receipt of the access request by the global context cache, the read cache to determine whether a corresponding entry exists;

checking, in response to no corresponding entry existing in the read cache, the write cache to determine whether a corresponding entry exists;

checking, in response to no corresponding entry existing in the write cache, the discard cache to determine whether a corresponding entry exists;

forwarding, in response to no corresponding entry existing in the discard cache, the access request to persistent storage for processing;

determining if the received access request will fail based on cache data in the global context cache; and in response to determining that the received access request will fail, returning an error directly to the microservice from the global context cache.

2. The method of claim 1, further comprising, in response to not determining that the access request will fail, processing the received access request.

3. The method of claim 1, wherein building the global context cache further includes building a delete cache.

4. The method of claim 3, further comprising establishing a hit rate parameter for the read cache, write cache, discard cache, and delete cache and a flush time parameter for the read cache, write cache, discard cache, and delete cache.

5. The method of claim 1, further comprising configuring a set of microservices of the plurality of microservices to use the global context cache, wherein the configuring includes providing, for each microservice of the set of microservices, a designation for each cache of the read cache, write cache, discard cache, and delete cache that indicates whether the microservice is authorized to use the cache.

6. The method of claim 1, further comprising creating a cache log for the global context cache, wherein the cache log contains a timestamped entry for cache data added to the global context cache.

7. The method of claim 1, further comprising creating a cache log for the global context cache, wherein the cache log contains a timestamped entry for cache data deleted from the global context cache.

8. An electronic computation device comprising:
a processor;
a memory coupled to the processor, the memory containing instructions, that when executed by the processor, cause the electronic computation device to:
build a global context cache for a plurality of microservice applications, each microservice application of the plurality of microservice applications being composed of a plurality of microservices, each microservice of the plurality of microservices being an independently deployed single process module that is executed in conjunction with other microservice applications in the microservice application, wherein the global context cache includes a read cache that contains data that has previously been read by at least one microservice of the plurality of microservices, a write cache that contains metadata related to a write operation to storage that has been performed by a microservice of the plurality of microservices, and a discard cache that includes metadata for at least one previous access request that was discarded due to an access failure;
receive an access request from a microservice from the plurality of microservice applications;
check, in response to receipt of the access request by the global context cache, the read cache to determine whether a corresponding entry exists;
check, in response to no corresponding entry existing in the read cache, the write cache to determine whether a corresponding entry exists;
check, in response to no corresponding entry existing in the write cache, the discard cache to determine whether a corresponding entry exists;
forward, in response to no corresponding entry existing in the discard cache, the access request to persistent storage for processing;
determine if the received access request will fail based on cache data in the global context cache; and
in response to determining that the received access request will fail, return an error to the microservice from the global context cache.

9. The electronic computation device of claim 8, wherein the memory further comprises instructions, that when executed by the processor, cause the electronic computation device to:
in response to not determining that the access request will fail, process the received access request.

10. The electronic computation device of claim 8, wherein the memory further comprises instructions, that when executed by the processor, cause the electronic computation device to:
build a delete cache in the global context cache.

11. The electronic computation device of claim 8, wherein the memory further comprises instructions, that when executed by the processor, cause the electronic computation device to:
establish a hit rate parameter for the read cache, write cache, discard cache, and delete cache and a flush time parameter for the read cache, write cache, discard cache, and delete cache.

12. The electronic computation device of claim 8, wherein the memory further comprises instructions, that when executed by the processor, cause the electronic computation device to:
configure a set of microservices of the plurality of microservices to use the global context cache, wherein the configuring includes providing, for each microservice of the set of microservices, a designation for each cache of the read cache, write cache, discard cache, and delete cache that indicates whether the microservice is authorized to use the cache.

13. The electronic computation device of claim 8, wherein the memory further comprises instructions, that when executed by the processor, cause the electronic computation device to:
create a cache log for the global context cache, wherein the cache log contains a timestamped entry for cache data added to the global context cache.

14. A computer program product for an electronic computation device comprising a computer readable storage medium having program instructions embodied therewith, the program instructions executable by a processor to cause the electronic computation device to:
build a global context cache for a plurality of microservice applications, each microservice application of the plurality of microservice applications being composed of a plurality of microservices, each microservice of the plurality of microservices being an independently deployed single process module that is executed in conjunction with other microservice applications in the microservice application, wherein the global context cache includes a read cache that contains data that has previously been read by at least one microservice of the plurality of microservices, a write cache that contains metadata related to a write operation to storage that has been performed by a microservice of the plurality of microservices, and a discard cache that includes metadata for at least one previous access request that was discarded due to an access failure;

receive an access request from a microservice from the plurality of microservice applications;

checking, in response to receipt of the access request by the global context cache, the read cache to determine whether a corresponding entry exists;

check, in response to no corresponding entry existing in the read cache, the write cache to determine whether a corresponding entry exists;

check, in response to no corresponding entry existing in the write cache, the discard cache to determine whether a corresponding entry exists;

forward, in response to no corresponding entry existing in the discard cache, the access request to persistent storage for processing;

determine if the received access request will fail based on cache data in the global context cache; and in response to determining that the received access request will fail, return an error to the microservice from the global context cache.

15. The computer program product of claim 14, further including program instructions, that when executed by the processor, cause the electronic computation device to:

in response to not determining that the access request will fail, process the received access request.

16. The computer program product of claim 14, further including program instructions, that when executed by the processor, cause the electronic computation device to:
build a delete cache in the global context cache.

17. The computer program product of claim 14, further including program instructions, that when executed by the processor, cause the electronic computation device to:
establish a hit rate parameter for the read cache, write cache, discard cache, and delete cache and a flush time parameter for the read cache, write cache, discard cache, and delete cache.

18. The computer program product of claim 14, further including program instructions, that when executed by the processor, cause the electronic computation device to:
configure a set of microservices of the plurality of microservices to use the global context cache, wherein the configuring includes providing, for each microservice of the set of microservices, a designation for each cache of the read cache, write cache, discard cache, and delete cache that indicates whether the microservice is authorized to use the cache.

* * * * *